United States Patent [19]
Penner

[11] 3,713,701
[45] Jan. 30, 1973

[54] DETACHABLE AUXILIARY TRACTOR TIRE AND WHEEL ATTACHMENT MEANS

[76] Inventor: John Penner, 109 Clearwater Road, Winnipeg, Manitoba, Canada

[22] Filed: Nov. 22, 1968

[21] Appl. No.: 778,108

[30] Foreign Application Priority Data

Feb. 17, 1968 Great Britain.......................7,896/68

[52] U.S. Cl. ...............................301/39 R, 301/39 C
[51] Int. Cl. ..............................................B60b 11/06
[58] Field of Search............................301/36, 39, 38

[56] References Cited

UNITED STATES PATENTS

| | | | |
|---|---|---|---|
| 1,327,607 | 1/1920 | Baker | 301/39 RC X |
| 3,223,455 | 12/1965 | Hammer | 301/39 |
| 3,237,992 | 3/1966 | Kiesau | 301/39 |
| 3,328,088 | 6/1967 | Olson | 301/39 |
| 3,337,270 | 8/1967 | Peterson | 301/36 |

FOREIGN PATENTS OR APPLICATIONS

| | | | |
|---|---|---|---|
| 10,662 | 7/1909 | France | 301/39 |
| 402,261 | 8/1909 | France | 301/39 RC |
| 411,455 | 4/1910 | France | 301/39 RC |

Primary Examiner—Richard J. Johnson
Attorney—Kent & Ade

[57] ABSTRACT

Means for detachably securing auxiliary tire and rim assemblies to the rear wheels of tractors utilizing modified wheel nuts for the main wheel attachment which enables bolts to be hooked to these nuts and extend to clips which engage over the outer rim of the auxiliary wheel thus clamping one to the other without the necessity of welding lugs, beads or other forms of attachment to the auxiliary wheel rim.

7 Claims, 5 Drawing Figures

PATENTED JAN 30 1973 3,713,701
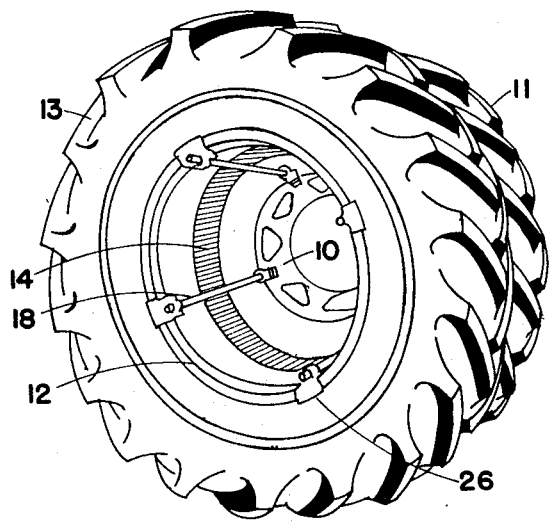
FIG. 1
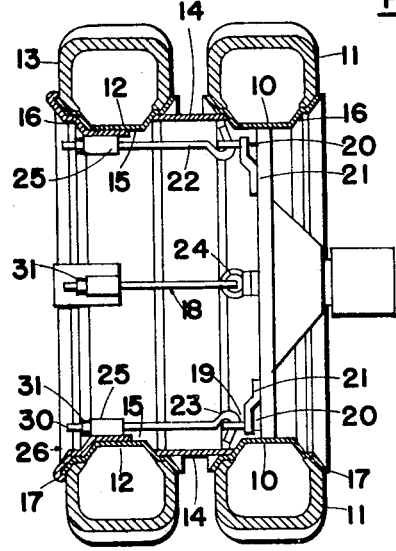
FIG. 2
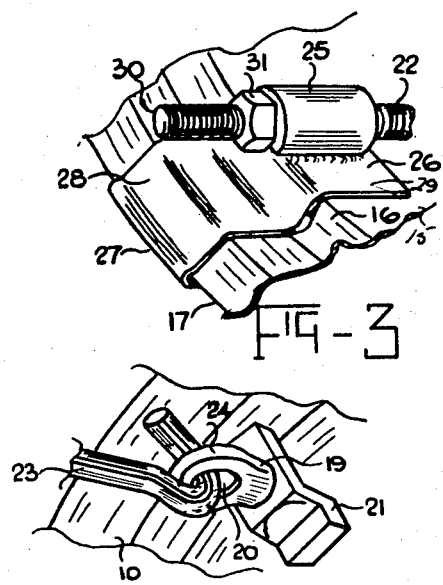
FIG-3
FIG-4
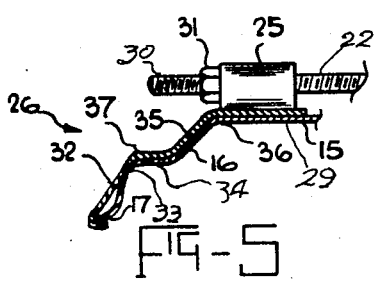
FIG-5
INVENTOR.
BY JOHN PENNER.
Kent & Ade
Attorneys

DETACHABLE AUXILIARY TRACTOR TIRE AND WHEEL ATTACHMENT MEANS

This invention relates to new and useful improvements in devices for detachably securing second or auxiliary wheels to the rear wheels of tractors or the like.

The rear wheels of present day tractors are usually satisfactory when used on relatively hard surfaces. However, when used for farming or the like, it is desirable that a second wheel be secured to each of the rear wheels for better distribution of weight which greatly reduces soil compaction and allows the soil to hold the moisture properly.

Also, dual rear wheels give less slippage and thus better traction and, in the majority of instances, improve the overall performance in both wet and dry conditions.

It is conventional to supply such second wheels, said wheels consisting of a rim upon which a tire and tube are mounted. In order to attach this wheel to the existing tractor wheel, it is normally necessary to weld a ring bead or lugs around the inner perimeter of the wheel rim being attached and then have bolts extending from this bead to attachment means on the existing wheel. It will be appreciated that it is relatively expensive to weld such a bead inasmuch as it is time consuming and utilizes considerable equipment. If it is desired to do this after the tire and tube are mounted on the rim, then, of course, it is necessary to demount the tire and tube prior to the welding operation.

There is also the danger of distorting the auxiliary wheel rim when welding the lugs or the like to the said rim.

These disadvantages add considerably to the cost of supplying a pair of second wheel rim and tire assemblies for the average tractor.

In addition the number of linkage assemblies used will vary from 4 points of contact on the rim to 12 points of contact, especially where the terrain is uneven and extra stability is required.

The present device overcomes all of the disadvantages of existing practices because there is no welding or machining required on the second wheel rim in order to attach same to the existing wheel rim, and by allowing the addition of 8 extra linkage assemblies to the existing installation as and when required, without necessitating any changes to the original installation.

The principal object and essence of the invention is therefore to provide a device of the character herewithin described which enables a second wheel rim and tire assembly to be secured to an existing tractor wheel, readily and easily and without the necessity of welding or otherwise interfering with the construction of the secondary rim.

A yet further object of the invention is to provide a device of the character herewithin described in which the additional wheel and tire assembly can readily be removed if it is desired.

A yet further object of the invention is to provide a device of the character herewithin described which is easily adapted to the majority of conventional tractor wheels and additional wheel assemblies provided therefor.

Still another object of the invention is to provide a device of the character herewithin described which is simple in construction, economical in manufacture, and otherwise well suited to the purpose for which it is designed.

With the foregoing in view, and such other or further purposes advantages or novel features as may become apparent from consideration of this disclosure and specification, the present invention consists of the inventive concept which is comprised, embodied, embraced or included in the method, process, construction, composition, arrangement of parts, or new use of any of the fore-going, herein exemplified in one or more specific embodiments of such concept, references being had to the accompanying Figures in which:

FIG. 1 is an isometric view of a tractor wheel with an additional wheel secured thereto by my invention.

FIG. 2 is an enlarged cross sectional view of a tractor wheel and additional wheel showing my invention securing one to the other.

FIG. 3 is a fragmentary enlarged isometric view showing the attachment to the second wheel rim.

FIG. 4 is an enlarged fragmentary isometric view showing the attachment of the hook end of the bolt to the original wheel of the tractor.

FIG. 5 is an enlarged fragmentary sectional view of FIG. 3.

In the drawings like characters of reference indicate corresponding parts in the different figures.

Proceeding therefore to describe the invention in detail, reference character 10 illustrates the rim of the existing tractor wheel having the tire 11 secured thereto.

Reference character 12 illustrates generally, the secondary rim of the wheel assembly designed to be secured to the original rim 10, and 13 illustrates the tire mounted on rim 12. These two rims are maintained in the desired spaced relationship by means of a cylindrical metal spacer 14 between the two wheel rims 10 and 12 as clearly shown in FIGS. 1 and 2.

The wheel rim 12 includes a cylindrical central portion 15 and annular side portions 16 terminating with axially outwardly extending terminal end flanges 17.

The two wheel assemblies are connected together by means of assemblies collectively designated 18 and these assemblies include eye-nuts 19 adapted to engage conventional wheel studs 20 extending through lugs 21, by which means the existing tractor wheel assembly is secured to the tractor axle as shown in FIG. 2.

A J-bolt 22 is provided with hook 23 on one end thereof engageable within the eye 24 of the nut 19. This bolt extends parallel to the spacer 14 and engages through a sleeve 25 which forms part of the attaching clip collectively designated 26 and which will be hereinafter described.

This clip, which is the important feature of the invention, includes a hooked end 27 engageable over the annular terminal end flange 17, and a body portion 28 conforming substantially to the stepped contour 16 of the rim. This body portion terminates in a horizontal portion 29 which lies on and engages the central cylindrical portion 15 and the cylindrical sleeve 25 is welded to this portion 29 as clearly shown in FIGS. 2 and 3.

The end 30 of the bolt 22 is screw-threaded and is engaged by nut 31 thus enabling the clip 26 to be engaged over the terminal end flange 17 and to pull the rim 15 against spacer 14 and hold it in the desired location relative to the rim 10.

It will, of course, be appreciated that there is a plurality of these fasteners around the wheel rim assembly as shown in FIG. 1, the number depending upon the load and design parameters.

The clips 26 engage over the terminal end flanges 17 easily and, once the nuts 31 are tightened correctly, cannot be removed unless the nuts are loosened.

It will therefore be appreciated that the second tire and rim assembly can be secured to existing tractor wheels with the use of only a socket wrench and they can readily be interchanged with other tractors providing the wheel sizes are similar.

The stepped contour 16 of said rim includes the afore mentioned annular or perimetrical terminal end flange 17 and a first annular step 32 which terminates in a first annular shoulder 33. A first annular, substantially horizontal portion 34 extends from said shoulder 33 and in turn connects with a second annular step 35. This step 35 terminates in a second annular shoulder 36 and the aforementioned cylindrical central portion 15 extends between the second shoulder 36, it being understood that there is a pair of stepped contours to each rim.

The clips 26 comprise the aforementioned hooked end 27 and the clip then spans the first step 32 of the stepped contour 16 of the rim, engaging the rim at the first shoulder 33 at which point the clip is angulated as at 37.

The clip then follows the remainder of the stepped portion contour as clearly shown in FIG. 5. This configuration enables a direct pull to be applied to the terminal end flange 17 and ensures the engagement of the hooked end 27 with the terminal end flange 17 thus taking into account any slight difference in contour due to manufacturing of both the clips and the wheel terminal end flanges.

Furthermore, the hooked portion 27 of the clip is arcuately curved as seen in FIG. 3, to follow the perimetrical curve of the terminal end flange thus ensuring a load distributing form of engagement of the clip to the rim.

Finally it will be appreciated that four linkage assemblies up to twelve or more linkage assemblies can be attached as dictated by conditions, without necessitating any changes to the original installation.

In other words, if for example, four assemblies are fitted it is easy to attach additional assemblies to other wheel nuts if conditions require these extra linkage assemblies.

Various modifications can be made within the scope of the inventive concept disclosed. Accordingly, it is intended that what is described herein should be regarded as illustrative of such concept and not for the purpose of limiting protection to any particular embodiment thereof, but that only such limitations should be placed upon the scope of protection to which the inventor hereof is entitled, as justice dictates.

What is claimed to be the present invention is:

1. A detachably mounted auxiliary tire and wheel assembly for tractor rear wheels, said rear wheels including a first tire and rim, wheel bolts and wheel nuts detachably securing said first tire and rim to the axle mounting of said tractor; said assembly comprising in combination a second tire and rim assembly, said second rim assembly including an annular axially outwardly extending terminal end flange around the outer perimeter thereof, annular spacer means between said first rim and said second rim, and means to detachably secure said second rim to said first rim in side by side relationship spaced apart by said annular spacer, said means comprising a plurality of bolts, means cooperating between one end of said bolts and said associated wheel nuts to detachably hook one to the other, clips detachably engaging said terminal end flange of said second rim assembly and means to detachably secure the other ends of said bolts to said clips, said second rim including a first annular step extending from said terminal end flange, an annular shoulder terminating said first step, an annular horizontal portion extending from said first shoulder, a second annular step extending from said horizontal portion, a second annular shoulder terminating said second step, and a cylindrical central portion extending from said second shoulder, said clip including a hooked end engaging over said terminal end flange, said clip having a cross sectional configuration substantially similar to the cross sectional configuration of said rim but spanning between said terminal end flange and said first shoulder thereof.

2. The device according to claim 1 in which said means to detachably secure the other ends of said bolts to said clips includes a cylindrical sleeve secured to said clip parallel with said bolt, said bolt extending through said sleeve, and nut means engaging said other end of said bolt extending through said sleeve.

3. The device according to claim 2 in which said clip includes a substantially horizontal portion engaging said cylindrical center rim portion, said sleeve being secured to said horizontal portion.

4. In a detachably mounted auxiliary tire and wheel assembly for tractor rear wheels in which said rear wheels include a first tire and rim, wheel bolts and wheel nuts detachably securing said first tire and rim to the axle mounting of said tractor, means for detachably securing said auxiliary tire and wheel assembly to said tractor rear wheel, said means including a plurality of bolts, clips detachably engageable over the axially outwardly extending terminal end flange of said auxiliary rim, and means to detachably secure said bolts to said clips, said second rim including a first annular step extending from said terminal end flange, an annular shoulder terminating said first step, an annular horizontal portion extending from said horizontal portion, a second annular shoulder terminating said second step, and a cylindrical central portion extending from said second shoulder, said clip including a hooked end engaging over said terminal end flange, said clip having a cross sectional configuration substantially similar to the cross sectional configuration of said rim but spanning between said terminal end flange and said first shoulder thereof.

5. The device according to claim 4 in which said means to detachably secure the other ends of said bolts to said clips includes a cylindrical sleeve secured to said clip parallel with said bolt, said bolt extending through said sleeve, and nut means engaging said other end of said bolt extending through said sleeve.

6. The device according to claim 5 in which said clip includes a substantially horizontal portion engaging said cylindrical center rim portion, said sleeve being secured to said horizontal portion.

7. In combination with a dual rim assembly of the type wherein an auxiliary rim is spaced by a cylindrical ring means from a main rim of a vehicle wheel having a plurality of clamp lugs with hook engaging means thereon, and said auxiliary rim includes inner and outer axially outwardly extending terminal rim edge flanges and therebetween a central base portion and a stepped portion including an axially extending tire bead seat flange, the improvement comprising a plurality of independent releasable and longitudinally adjustable connecting devices extending between and releasably engaging each hook engaging means and said auxiliary rim, each device comprising:

A. link means having a hook portion for attachment to one of said hook engaging means on the main vehicle wheel, B. a flat strip means bridging said axially extending tire bead seat flange and supported by and parallel to the central base portion of said auxiliary rim, said strip means having a hook portion at one end for removably engaging the outer axially extending terminal rim edge flange of said auxiliary rim, and C. adjustable means secured to said link means and engaging said flat strip means near its other end for varying the distance between said link means and said strip means.

* * * * *

Notice of Adverse Decision in Interference

In Interference No. 97,135 involving Patent No. 3,713,701, J. Penner, DETACHABLE AUXILIARY TRACTOR TIRE AND WHEEL ATTACHMENT MEANS, final judgment adverse to the patentees was rendered June 13, 1973, as to claim 15.

[*Official Gazette of September 24, 1974.*]